United States Patent
Tarreau

(10) Patent No.: US 9,032,524 B2
(45) Date of Patent: May 12, 2015

(54) LINE-RATE PACKET FILTERING TECHNIQUE FOR GENERAL PURPOSE OPERATING SYSTEMS

(71) Applicant: HAProxy S.á.r.l, Luxembourg (LU)

(72) Inventor: Willy Tarreau, Fontenay aux roses (FR)

(73) Assignee: HAProxy S.á.r.l., Luxembourg (LU)

( * ) Notice: Subject to any disclaimer, the term of this patent is extended or adjusted under 35 U.S.C. 154(b) by 0 days.

(21) Appl. No.: 14/482,790

(22) Filed: Sep. 10, 2014

(65) Prior Publication Data
US 2015/0074792 A1    Mar. 12, 2015

Related U.S. Application Data

(60) Provisional application No. 61/876,058, filed on Sep. 10, 2013.

(51) Int. Cl.
H04L 29/06       (2006.01)

(52) U.S. Cl.
CPC ........ *H04L 63/0227* (2013.01); *H04L 63/1458* (2013.01)

(58) Field of Classification Search
CPC ..................... H04L 63/0227; H04L 63/1458
USPC ........................................................... 726/23
See application file for complete search history.

(56) References Cited

U.S. PATENT DOCUMENTS

| | | | |
|---|---|---|---|
| 6,728,885 B1 * | 4/2004 | Taylor et al. | 726/24 |
| 8,191,132 B1 | 5/2012 | Boscolo et al. | |
| 2003/0154399 A1 * | 8/2003 | Zuk et al. | 713/201 |
| 2005/0240993 A1 | 10/2005 | Treadwell et al. | |
| 2007/0143846 A1 | 6/2007 | Lu | |
| 2007/0234428 A1 * | 10/2007 | Rash | 726/25 |
| 2008/0144523 A1 * | 6/2008 | Nishi et al. | 370/253 |
| 2008/0289027 A1 * | 11/2008 | Yariv et al. | 726/11 |
| 2010/0322071 A1 * | 12/2010 | Avdanin et al. | 370/230 |
| 2011/0179479 A1 * | 7/2011 | Tsai et al. | 726/13 |
| 2013/0254085 A1 * | 9/2013 | Tanimoto et al. | 705/37 |

OTHER PUBLICATIONS

ISR/WO mailed on Mar. 18, 2015 for International Patent Application No. PCT/182014/002064 filed on Sep. 10, 2014, all pages.

* cited by examiner

*Primary Examiner* — Mohammad L Rahman
(74) *Attorney, Agent, or Firm* — Kilpatrick Townsend & Stockton LLP

(57) ABSTRACT

A method for mitigating denial of service attacks may include filtering out invalid packets from the received packets using a first filtering module, allowing the valid packets to pass through the first filtering module, and allowing some invalid packets to pass through the first filtering module. The method may also include passing the valid packets and the remaining invalid packets from the first filtering module to a second filtering module, filtering out more of the invalid packets using the second packet filtering module, allowing the valid packets to pass through the second filtering module, and allowing some invalid packets to pass through the second filtering module. The method may additionally include passing the valid packets and the remaining invalid packets to a protocol stack to filter the remaining invalid packets and pass the valid packets through to an application.

16 Claims, 12 Drawing Sheets

LINE-RATE PACKET FILTERING TECHNIQUE FOR GENERAL PURPOSE OPERATING SYSTEMS

CROSS-REFERENCES TO RELATED APPLICATIONS

This application claims the benefit of U.S. Provisional Application No. 61/876,058 filed Sep. 10, 2013, titled "Line-Rate Packet Filtering Technique for General Purpose Operating Systems," which is hereby incorporated by reference for all purposes.

BACKGROUND

This disclosure relates in general to packet filtering and, but not by way of limitation, to systems and methods for denial of service (DoS) and distributed DoS (DDoS) attack mitigations.

Operating systems running on computers connected to the Internet provide some communication services known as a protocol stack, typically a TCP/IP stack. The purpose of this protocol stack is to permit local applications to communicate with remote applications over a medium (for example, a web browser communicating with a web server over Ethernet). The protocol stack splits outgoing data streams into packets delivered to the medium, and assembles incoming packets into data streams to be delivered to the application. A stream of related packets is generally known as a "session." The task of identifying what session a packet belongs to, and what application it needs to be delivered to is generally very expensive, and implicates many controls for validity, protocols compliance and timing, and many memory lookups to find a relevant session among a collection of existing sessions that can grow very large.

Some ill-intentioned entities are exploiting the high cost of managing a large session table and only allowing valid packets in DoS and DDoS attacks. Many zombie agents can be used together in a concerted attack. A DDoS attack sends many random or fixed packets from one or multiple sources, sometimes pretending to be another source ("spoofing"), to maximize the cost of analyzing these packets on the target system. When the packet rate reaches the system's limit, it can no longer deliver its purposed service to regular users. These attacks are used for blackmail, for retaliation, to attract blocked customers to another service, or sometimes merely for entertainment and to cause havoc.

Some DDoS attacks tend to work better than others because of the extra cost associated with packet processing. Most commonly, TCP SYN packets are used ("SYN flood attacks") as they require either some storage (session creation), or some cryptographic computation (SYN cookies). These common attacks generally can be efficiently dealt with using dedicated hardware to generate SYN cookies. Therefore, other forms of attacks exist—such as ACK floods, RST floods—which pretend to be part of existing sessions, generally rendering the stateless dedicate hardware helpless. Another form of attack usually consists of filling the physical link with useless packets that will generally be dropped (e.g., ICMP flood). Still another attack targets connectionless services, such as DNS, using UDP packets. All of the DDoS attacks above are expensive for the host computer to process and generally render it totally unresponsive to normal requests.

DDoS attacks come in many other varieties and are constantly evolving as the technology to defeat them improves. DoS attack methods include IP spoofing, bandwidth consumption attacks (such as smurf attacks and fraggle attacks) and resource starvation attacks (such as the SYN floods mentioned above). One example of technology designed to defeat DDoS attacks is a traditional firewall that matches packets to a session prior to allowing them to pass while operating in Level 5 of the Open Systems Interconnection (OSI) model. The amount of processing required to implement a firewall leaves it susceptible to DDoS attack as the processing power available is quickly exhausted when using a commodity or software-based firewall. A sufficiently powerful firewall can defeat a DDoS attack, but these solutions are very expensive in both cost and processing power.

The software stack on the server does a good job at filtering out nefarious packets, but it is easily overwhelmed. The protocol stack is an implementation of a computer networking protocol suite. Without a firewall, the software stack is particularly vulnerable to DDoS attacks. One example of a protocol stack is TCP/IP, which operates in Level 3-5 of the OSI model. Other examples of protocol stacks implement the computer networking protocol suite for HTTP, Ethernet, etc.

BRIEF SUMMARY OF THE INVENTION

In some embodiments, a packet shield system for mitigating denial of service (DoS) and/or distributed denial of service (DDoS) attacks against one or more applications associated with a server may be presented. The packet filtering system may include a first filtering module that processes received packets, where the received packets having been transmitted to the packet filtering system through a network. The first filtering module may be configured to filter out a first plurality of invalid packets from the received packets, to allow a plurality of valid packets from the received packets to pass through the first filtering module, and to allow a second plurality of invalid packets from the received packets to pass through the first filtering module. At least some of the first plurality of invalid packets and at least some of the second plurality of invalid packets may be sent to the packet filtering system as part of the DoS and/or DDoS attack. The second plurality of invalid packets may include a third plurality of invalid packets and a fourth plurality of invalid packets. The packet filtering system may also include a second filtering module communicatively coupled in series with the first packet filtering module. The second packet filtering module may be configured to receive the plurality of valid packets and the second plurality of invalid packets from the first filtering module, to filter out the third plurality of invalid packets, to allow the plurality of valid packets to pass through the second filtering module, and to allow the fourth plurality of invalid packets to pass through the second filtering module. The packet filtering system may further include a protocol stack interface configured to pass the plurality of valid packets and the fourth plurality of invalid packets from the second filtering module to a protocol stack. The protocol stack may filter out the fourth plurality of invalid packets and allow the plurality of valid packets to pass through to the one or more applications.

According to various aspects, the second filtering module may be configured to respond to sources of each of the plurality of valid packets and sources of the second plurality of invalid packets, and the first filtering module may be configured to filter out the first plurality of invalid packets without responding to sources of the first plurality of invalid packets. The first filtering module may be effective at filtering a first type of invalid packet, but ineffective at filtering a second type of invalid packet, and the second filtering module may be effective at filtering the second type of invalid packet. The first filtering module may be configured to identify spoofed packets by storing a collection of valid time-to-live (TTL) indicators associated with a source address, receiving incoming packets associated with the source address, extracting a TTL indicator for each incoming packet, comparing the extracted TTL indicator to the collection of valid TTL indicators, and determining whether the incoming packets are valid based on whether the extracted TTL indicators fall within a range of the valid TTL indicators. The second filtering module may include a hash function that assigns a hash value to each packet received by the second filtering module, and an activity table comprising entries for each hash value, where the entries may indicate whether a received packet belongs to a valid session. The activity table may be a fixed size and small enough to be stored in a single CPU core. The packet filtering system may run on a single core processor at a 10 Gbit/sec line rate. The packet filtering system may also include a third filtering module configured to receive packets identified as invalid by the first filtering module or the second filtering module, group the packets identified as invalid into packet groups based on characteristics of the packets identified as invalid, generate signatures for each packet group, compare each packet that is passed through the first filtering module and the second filtering module to the signatures, and filter out packets that are passed through the first filtering module and the second filtering module and that match at least one of the signatures. The first packet filtering module and the second packet filtering module may filter invalid packets such that less than 200,000 packets per second are delivered to the protocol stack for filtering.

In some embodiments, a method for mitigating denial of service (DoS) and/or distributed denial of service (DDoS) attacks against one or more applications associated with a server may be presented. The method may include receiving packets transmitted to the packet filtering system through a network, filtering out a first plurality of invalid packets from the received packets using a first filtering module, allowing a plurality of valid packets from the received packets to pass through the first filtering module, and allowing a second plurality of invalid packets from the received packets to pass through the first filtering module. At least some of the first plurality of invalid packets and at least some of the second plurality of invalid packets may be sent to the packet filtering system as part of the DoS and/or DDoS attack. The second plurality of invalid packets may include a third plurality of invalid packets and a fourth plurality of invalid packets. The method may also include passing the plurality of valid packets and the second plurality of invalid packets from the first filtering module to a second filtering module that is communicatively coupled in series with the first packet filtering module, filtering out the third plurality of invalid packets using the second packet filtering module, allowing the plurality of valid packets to pass through the second filtering module, and allowing the fourth plurality of invalid packets to pass through the second filtering module. The method may additionally include passing the plurality of valid packets and the fourth plurality of invalid packets from the second filtering module to a protocol stack. The protocol stack may filter out the fourth plurality of invalid packets and allows the plurality of valid packets to pass through to the one or more applications.

In some embodiments, a method for filtering packets originating from the Internet may be presented. The method may include loading a plurality of filtering modules including a first filtering module and a second filtering module, and receiving a plurality of packets from various sources from the Internet. The method may also include applying the first filtering module to the plurality of packets to identify a first packet that is invalid, and filtering the first packet prior to a protocol stack. The method may additionally include applying the filtering shield module to the plurality of packets to identify a second packet that is invalid, and filtering the first packet prior to the protocol stack. The method may further include passing a third packet from the plurality of packets to the protocol stack that determines the third packet is invalid. In various aspects of these embodiments the protocol stack may pass information to at least one of the plurality of shield modules.

In some embodiments a packet filtering system may include a first filtering means that processes received packets, where the received packets having been transmitted to the packet filtering system through a network. The first filtering means may be configured to filter out a first plurality of invalid packets from the received packets, to allow a plurality of valid packets from the received packets to pass through the first filtering means, and to allow a second plurality of invalid packets from the received packets to pass through the first filtering means. At least some of the first plurality of invalid packets and at least some of the second plurality of invalid packets may be sent to the packet filtering system as part of the DoS and/or DDoS attack. The second plurality of invalid packets may include a third plurality of invalid packets and a fourth plurality of invalid packets. The packet filtering system may also include a second filtering means communicatively coupled in series with the first packet filtering means. The second packet filtering means may be configured to receive the plurality of valid packets and the second plurality of invalid packets from the first filtering means, to filter out the third plurality of invalid packets, to allow the plurality of valid packets to pass through the second filtering means, and to allow the fourth plurality of invalid packets to pass through the second filtering means. The packet filtering system may further include a protocol stack interface means configured to pass the plurality of valid packets and the fourth plurality of invalid packets from the second filtering means to a protocol stack. The protocol stack may filter out the fourth plurality of invalid packets and allow the plurality of valid packets to pass through to the one or more applications.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

Figure 1:
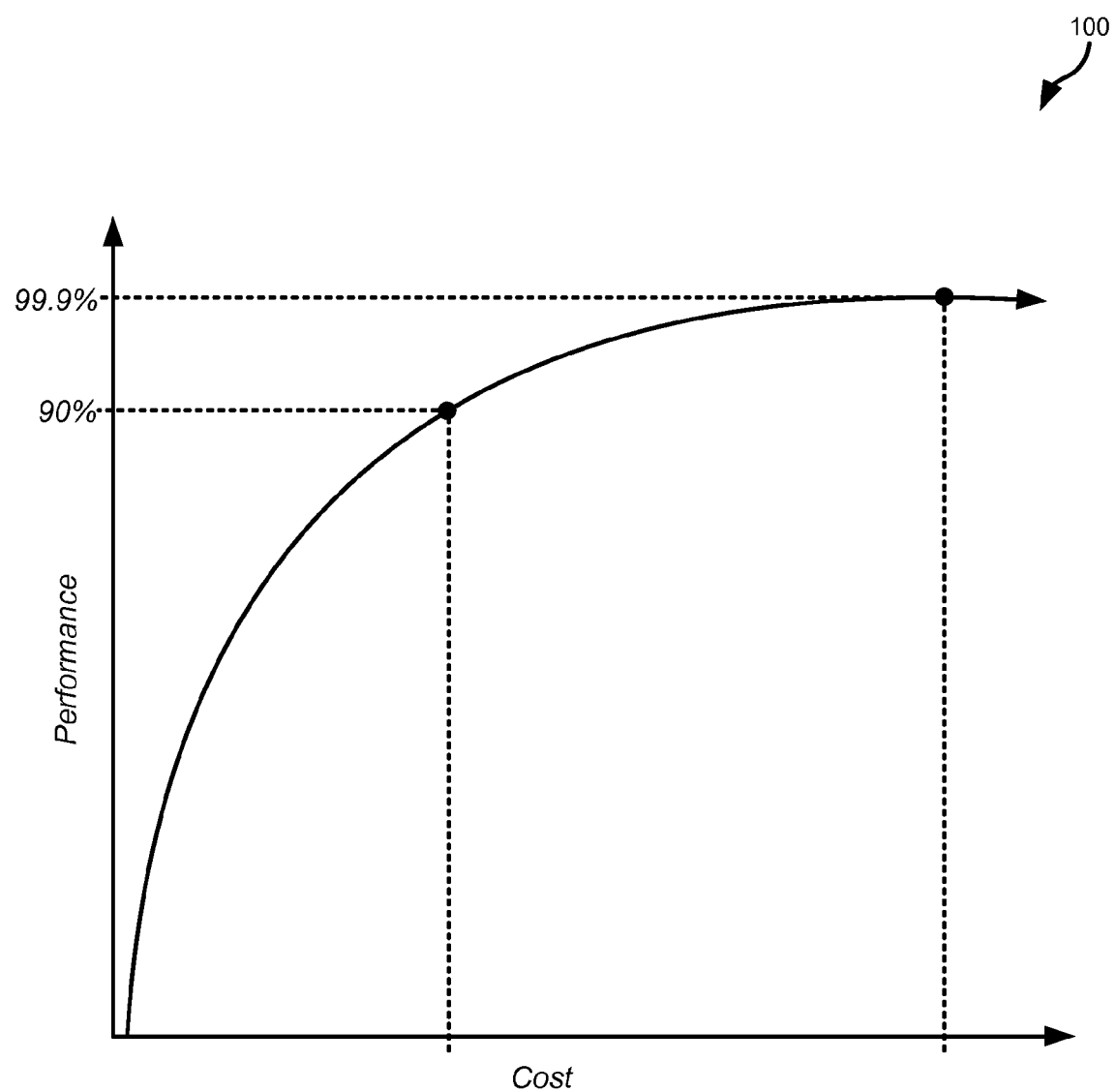
FIG. 1 illustrates a performance versus cost graph for each filtering technique in a packet shield architecture, according to some embodiments.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

In one embodiment, the present disclosure provides for a packet shield system implemented as a collection of modular software components, each of which uses various techniques to filter incoming packets before they reach the protocol stack of the host computer. In addition to evicting clearly invalid packets, the techniques trade computing resources for filtering accuracy. They may also rely on the protocol stack to perform the last level of accurate filtering.

In order to handle most large-scale DoS/DDoS attacks, traditional firewalls need to consume tremendous resources in terms of processing power, memory bandwidth, and memory usage. They rely on a comprehensive session table that is very accurate, but also very large and expensive to maintain. At high bandwidths, such as a 10 Gbit/sec line rate, the size of the session table and associated memory can require 100's of GB of storage space. Session tables of such large size cannot be effectively stored in the cache memory of the CPU core, and must instead be stored in slower off-chip memory. Therefore, look-up times are slow, and the bandwidth of the firewall must necessarily decrease during a large-scale DoS/DDoS attack.

The session tables and traditional firewalls are slow and resource consuming, but they are also very accurate. The session tables are configured to guarantee that no invalid packets pass through the firewall. As used herein, the term "invalid packet" may include any packet that is suspicious, from an unknown origin, and/or part of a DoS/DDoS attack. In order to guarantee that no invalid packets are passed through the firewall, even some of the valid packets may be eliminated.

In contrast, embodiments of a packet shield system described herein can be nearly as effective as a traditional firewall, however these embodiments require just a fraction of the computing power and memory usage. In general, a packet shield combines a plurality of packet filtering techniques, each embodied in an interchangeable filtering module. Each of the individual filtering modules are purposely designed to be less-than-perfect. However, the system compensates for the imperfections of any single filtering module in other modules, such that the combination of modules provides for a nearly perfect solution.

FIG. 1 illustrates a performance versus cost graph 200 for each filtering technique in a packet shield architecture, according to some embodiments. In general, packet filtering techniques will exhibit a cost/performance curve similar to that shown in graph 200. The cost axis refers to computing power, memory usage, memory bandwidth, processing requirements, and/or power usage. The performance axis refers to how effective a particular filtering technique can be in accurately recognizing invalid packets while allowing valid packets to pass through. As illustrated by graph 200, the cost/performance curve approaches 100% performance asymptotically. The shape of the curve illustrates how increases in performance are relatively low cost during the left portion of the curve. However, increases in performance are relatively costly towards the right portion of the curve. Merely by way of example, moving from a performance metric of 50% to 90% may be only a fraction of the cost of moving from a performance metric of 90% to 99%.

The embodiments described herein use filtering modules designed to operate in the left-hand portion of the cost/performance curve. This allows each individual filtering module to operate in relatively low-cost environments, typically requiring only the memory and processing power of a single CPU core. While the performance of any individual filtering module may be unacceptably low, particular combinations of filtering modules may work together to provide a very high performance packet filtering system.

Figure 2:
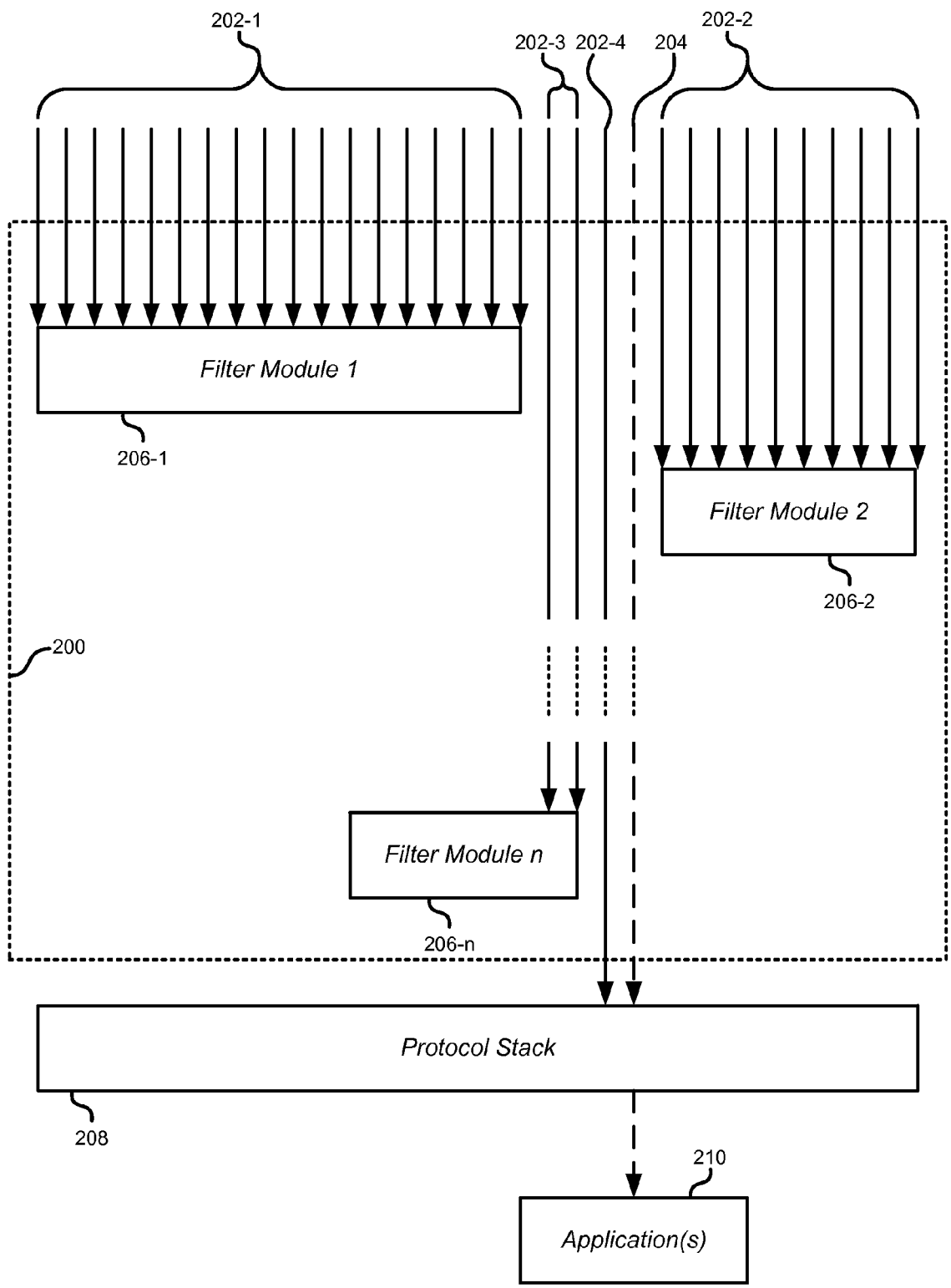
FIG. 2 illustrates a diagram of a packet shield architecture, according to some embodiments.

FIG. 2 illustrates a diagram of a packet shield system 200, according to some embodiments. The packet shield system 200 can receive both valid packets 204 as well as invalid packets 202. A first filtering module 206-1 may be configured to eliminate only a percentage of the total number of invalid packets 202. For example, the first filtering module 206-1 may only need to eliminate 50% of the invalid packets. In other words, the first filtering module 206-1 can be configured to eliminate a first plurality of the invalid packets 202-1 while allowing a second plurality of invalid packets 202-2 to pass through. Note that this is precisely the opposite of what occurs in a traditional firewall, where the firewall eliminates all invalid packets, guaranteeing that only valid packets are passed through. Here, the first filtering module 206-1 guarantees that all valid packets pass through while eliminating only a portion of the invalid packets.

This level of performance would normally be unacceptable. However, the packet shield system 200 does not employ a single filter module, but rather employs an intelligent combination of a plurality of filter modules 206. As a design principle, the first filtering module 206-1 can be designed to quickly eliminate packets that are very clearly invalid. Thus the first filtering module 206-1 can have the primary goal of reducing the incoming packet bandwidth. This allows later filtering modules to spend more time and processing power on each packet.

In this example, a second filtering module 206-2 may be configured to receive the valid packets 204 and the invalid packets 202-2, 202-3, 202-4 that were passed through the first filtering module 206-1. Similar to the first filtering module 206-1, the second filtering module 206-2 may be designed to specifically target a certain type of invalid packet. For example, if the first filtering module 206-1 is configured to target spoofed packets, the second filtering module 206-2 can be configured to determine whether packets belong to a valid session. Also similar to the first filtering module 206-1, the second filtering module 206-2 may trade performance for cost savings, such that some of the invalid packets 202-3, 202-4 are passed through along with the valid packets 204.

Filtering modules can continue to be stacked on top of each other in parallel or in series as illustrated in FIG. 2. Because each of the filtering modules 206 trades cost for performance, each of the filtering modules 206 may be relatively small and cost efficient compared to a traditional firewall. Each additional filtering module 206 may be configured specifically to catch the types of invalid packets that are passed through preceding filtering modules. This is illustrated graphically in FIG. 2.

As stated above, traditional firewalls attempt to guarantee that no invalid packets are passed through to the protected computer system behind the firewall. In contrast, the packet shield system 200 guarantees that all of the valid packets will be passed through along with possibly some invalid packets. The packet shield system 200 then relies on a protocol stack 208 of the protected computer system to filter out the remaining invalid packets. For example, many protected computer systems may include a protocol stack 208 in the form of a TCP/IP stack in the OSI model. Generally, the traditional firewall would eliminate all invalid packets because the protocol stack 208 is easily overwhelmed when performing filtering operations. However, because the packet shield system 200 has filtered the vast majority of invalid packets, the number of invalid packets passed to the protocol stack 200 may be relatively small. For example, one exemplary packet shield system 200 has been found to reduce the packet load to fall well below the performance limit of a typical protocol stack 208. For a server operating at 10 Gbit/sec (approximately 15,000,000 packets/second) the packet shield system 200 layered with three/four different filtering modules was able to operate without a firewall and eliminate 99% of the invalid packets, leaving only approximately 150,000 packets per second to be filtered by the protocol stack 208. After the filtering is performed by the protocol stack 208, the remaining valid packets can be passed to the applications 210 running on or being protected by the server.

Having described the general architecture of the packet shield system 200, it will be clear in light of this disclosure that many different filtering modules 206 may be intelligently layered together in order to filter the majority of invalid packets during a DoS/DDoS attack. For exemplary purposes only, the following figures and description will describe one such arrangement of novel filtering modules and how their combination effectively filters most invalid packets while running on a single core CPU.

Figure 3:
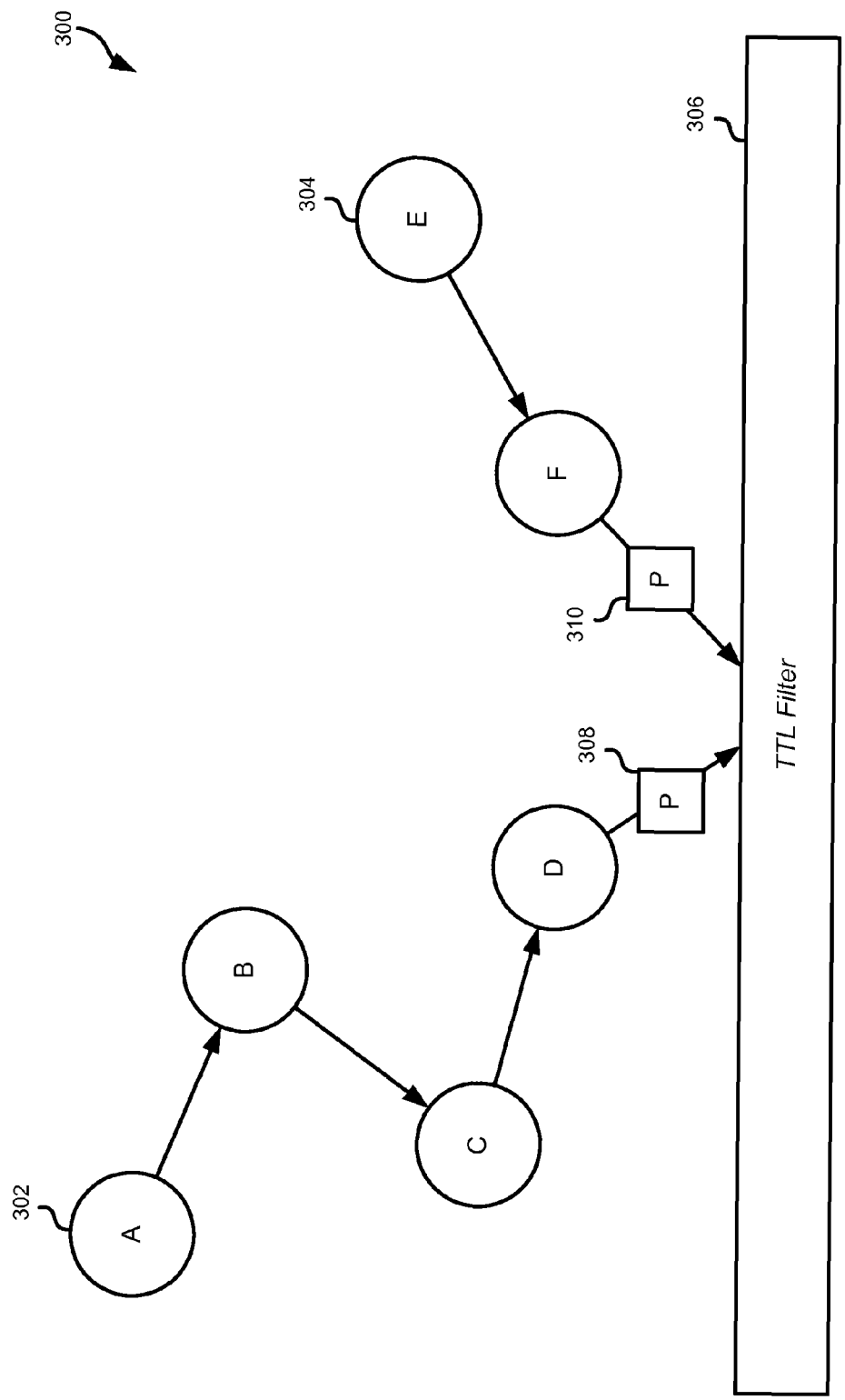
FIG. 3 illustrates a TTL filtering operation, according to some embodiments.

FIG. 3 illustrates one implementation of a first filtering operation, according to some embodiments. Each incoming packet can be associated with a time-to-live (TTL) indicator that is used to limit or measure the lifespan of data as it travels across a computer network. The TTL indicator can include a timestamp counter that is embedded as part of the packet information. Under the standard IP protocol, the TTL indicator can comprise an 8-bit field that serves as an upper bound on the number of router hops allowed/encountered en route to the packet destination. Each router hop will decrement a counter value as part of the TTL indicator.

A first filtering module, or first filtering means, may utilize the TTL indicator to eliminate spoofed packets. Generally, this particular implementation of the first filtering module may be referred to as a TTL filter 306. The TTL filter 306 can examine the TTL of incoming packets from a particular source and identify inconsistencies between the source and the TTL to filter spoofed packets. The TTL filter 306 can maintain a table of valid TTL's—a TTL lookup table (LUT)—for incoming packet addresses. In one embodiment, the TTL filter 306 can leverage the fact that most routing paths are approximately the same for source addresses in the same network. Thus, packets coming from the same source address should have approximately the same TTL value upon arriving at the TTL filter 306. The table of valid TTL's can store valid TTL values for all of the approximately 14,000,000 valid IPv4 source networks that can coexist on the Internet.

Upon receiving an incoming packet, the TTL filter 306 can use the source address to index table of valid TTL's and determine whether the TTL of the incoming packet falls within a specified range of valid TTL's for that source address. Some embodiments may store the table of valid TTL's entirely in CPU cache, making a TTL lookup operation very fast and commonly only taking a single memory access. Other embodiments can store the most commonly used table entries in CPU cache for fast lookup.

By way of example, packet 302 and packet 304 may be received from the same source address. However, packet 302 may have been routed through twice as many hops as packet 304, resulting in a discrepancy between the TTL value for packet 302 and the TTL value of packet 304. The TTL filter 306 can use the source address for packet 302 and packet 304 to look up a range of valid TTL values. Assuming that the TTL value of packet 302 falls in the valid range of TTL values, and assuming that the TTL value of packet 304 falls outside of the range of valid TTL values, packet 304 can be eliminated at this stage as an invalid spoofed packet, while packet 304 can be passed through as a packet that may be valid.

One advantage of using the TTL filter 306 as the first filtering module is that packets can be eliminated without requiring a response. In one embodiment, up to 50% of the incoming packets could be identified using the TTL filter 306 as spoofed packets. Because these packets could be eliminated as invalid, the response traffic could be also be cut in half. Generally, a SYN packet received by a traditional firewall would require a SYN-ACK packet to be sent by the firewall in response, e.g. 10 Gbit/sec of received SYN packets would require 10 Gbit/sec of responsive SYN-ACK packets to be sent. By immediately eliminating spoofed packets by way of TTL filtering, the outgoing SYN-ACK responses could be reduced to approximately 5 Gbit/sec.

Figure 4:
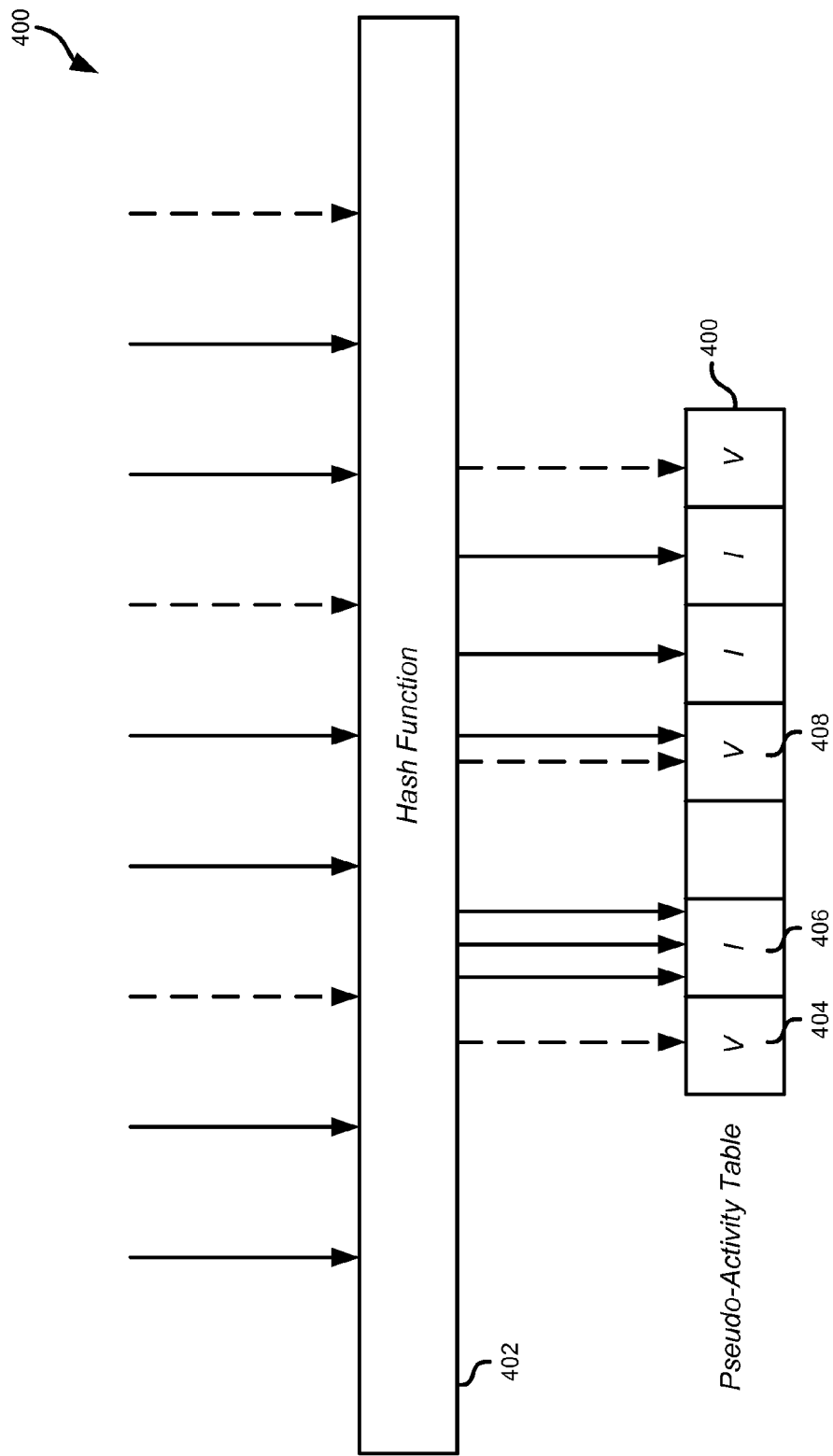
FIG. 4 illustrates a diagram of a pseudo-activity table, according to some embodiments.

FIG. 4 illustrates a second packet filtering module, or second filtering means, according to some embodiments. This particular implementation of the second packet filtering module may comprise what is referred to as a pseudo-activity table 400. This may operate in a fashion similar to the more complicated session table of a traditional firewall. Generally, the pseudo-activity table 400 may include last-visit dates of session groups and may be used to determine if a received packet is part of a live session.

Instead of requiring a large session table that exhaustively catalogs each valid/invalid session known to the firewall, the actual system can use a pseudo-activity table 400 that is much smaller and possibly of fixed size. The fixed-size pseudo-activity table (also referred to herein as simply an "activity table") can be sized/designed to fit in the on-chip CPU cache.

This can avoid expensive memory lookups and provide a determination very quickly about the validity of incoming packets. The infrequent memory accesses allows the on-chip cache to be used concurrently by multiple CPU cores if needed.

In this embodiment, incoming packets can be processed by a hash function 402 that is used to index the pseudo-activity table 400. In FIG. 4, valid incoming packets are represented by a dashed line, while incoming invalid packets are represented by solid lines. As illustrated, each valid/invalid packet is processed by the hash function 402 and indexed in the pseudo-activity table 400. Because the size of the pseudo-activity table 400 is much smaller than the exhaustive session table of a traditional firewall, some collisions may occur, i.e., some valid and invalid packets may be mapped to the same session ID. For example, table entry 404 represents a valid sessions and is mapped to a single valid incoming packet. Table entry 406 represents invalid sessions and is mapped to three invalid incoming packets. Table entry 408 receives both an invalid packet and a valid packet, and as a result represents a valid session because the collision includes at least one valid packet. By reducing the size of the pseudo-activity table 400 and using a hash function, this ensures that all valid packets will pass through this filtering module, but also allows a certain number of invalid packets to pass through as well. The invalid packets can be filtered by later filtering modules in the packet shield system, or can be left to the protocol stack for filtering.

In some embodiments, the size of the pseudo-activity table and/or the implementation of the hashing algorithm may be adjusted dynamically to maintain a low collision rate while balancing processing/memory costs. The pseudo-activity table can be scaled to a size to ensure that relatively few invalid packets are allowed to pass through to the protocol stack. Combining this filtering module with a few other filtering modules allows the volume of attack-related packets that reach the protocol stack to remain low enough so that the protocol stack can easily process with them without being overwhelmed with invalid packets. This method provides better results than using a firewall, as the bulk of the traffic is eliminated before the protocol stack (even at packet rates that firewalls could not deal with), and without an unreasonably large session table. Fine-grained filtering is done by the protocol stack which has more information on valid traffic than an intermediate firewall.

In one embodiment, the size of the pseudo-activity table 400 can be chosen and/or dynamically adjusted during operation according to a number of factors including, but not limited to, hardware limitations and cost, session count and line rate, and the number of invalid packets reaching the protocol stack. Another embodiment can chose to automatically resize this table if these parameters change with time (e.g., available resources in virtualized environments, or too much attack traffic still reaching the protocol stack). Other embodiments could instead choose the size of the activity table based upon what resources are not otherwise consumed by the server and scale back as the server becomes loaded with other tasks. Dynamic values for the various parameters (e.g. memory usage, invalid packet rate, overall packet rate, look up time, etc.) may be compared to stored ideal threshold values, and the size of the pseudo-activity table 400 may be increased or decreased in order to bring the dynamic values within the range of the threshold values. In one embodiment, the pseudo-activity table may comprise approximately 3,000,000 entries. In another embodiment, an excellent level of accuracy was achieved at line rate with only 8,388,608 entries (approximate 16 MB of memory) implements it entirely in the CPU cache.

A third packet filtering module, or third filtering means, may perform a statistical analysis of incoming packets to identify patterns that can be associated with valid packets and patterns that can be associated with invalid packets. Generally, DoS/DDoS attacks involve packets that have repetitive aspects. These repetitive aspects are often the same or vary slightly between packets involved in the DoS/DDoS attack. For example, invalid packets that are part of an attack may originate from a few source addresses, have similar TTL's, may have similar payloads with only a few data fields varying, and the like. This packet filtering module can analyze incoming packets and aggregate the aspects of invalid packets that are the same or only slightly varying. These common aspects can be used to generate a "packet signature" or fingerprint that can be used to identify incoming packets as invalid and part of a DoS/DDoS attack. The packet signature can specify certain data fields that should fall within an expected value range, data fields that should match an exact value, and/or data fields that can vary randomly or according to a known pattern. The packet signature can be generated by identifying packets that have similar or repetitive aspects and grouping those packets to generate a representative signature. Each incoming packet can have its data fields compared to the data fields of the packet signature by this filtering module, and if a sufficient number of data fields match, the packet can be evicted as invalid.

A fourth type of packet filtering module, or fourth filtering means, may operate in a slightly different manner than those packet filtering modules described above. Specifically, the fourth type of packet filtering module does not need to specifically evict packets as invalid, but can instead lower the processing load of certain packet shield system parameters or protocol stack parameters as the bandwidth becomes saturated. This can allow the packet shield system to maintain a constant and very high line rate while also maintaining the fast, low-cost approach to layering filtering modules described herein.

Figure 5:
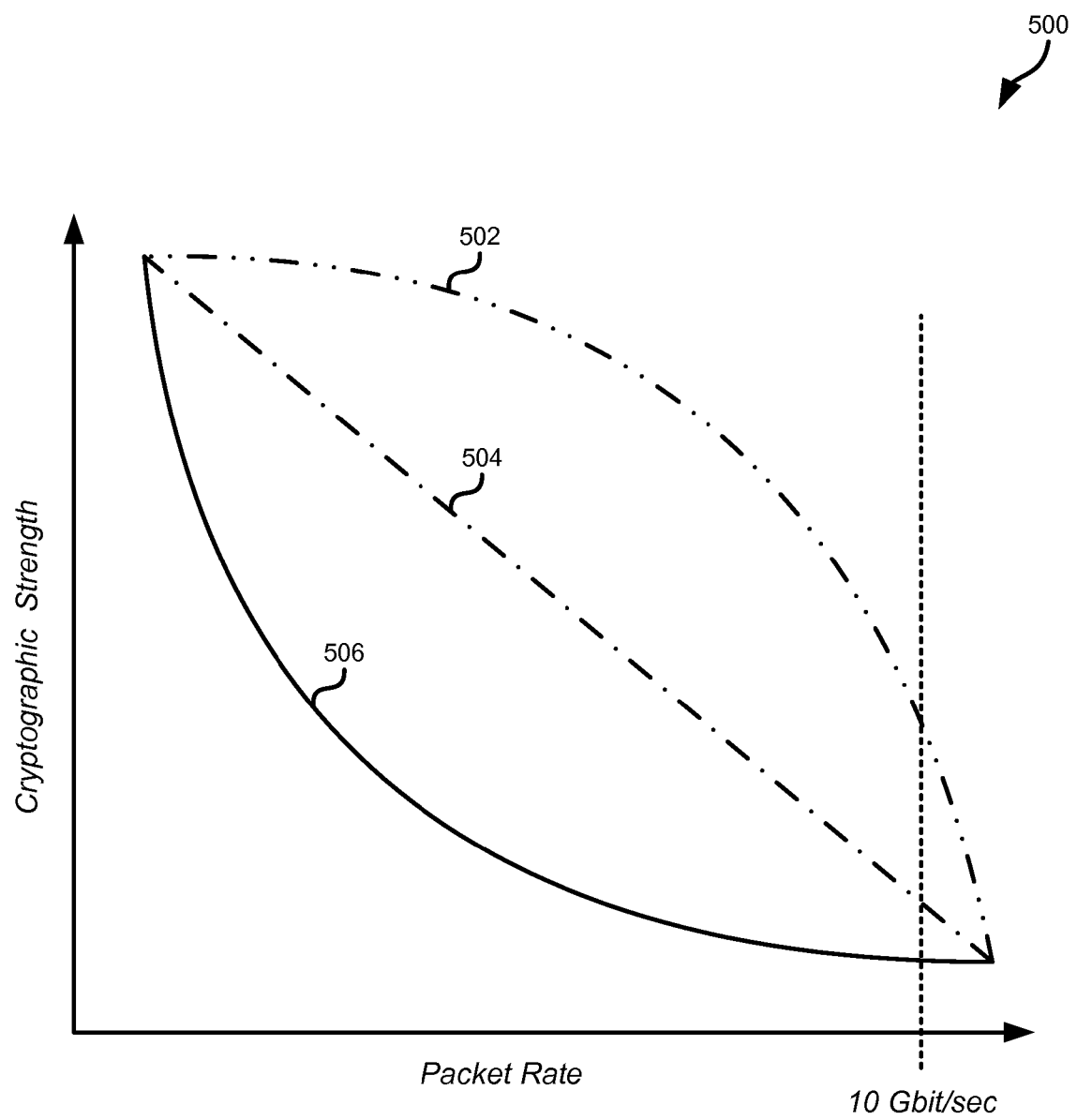
FIG. 5 illustrates a cryptographic strength versus packet rate graph for a cookie verification filtering technique, according to some embodiments.

In one specific implementation of this type of filtering module, the strength of cryptographic algorithms used in responding to TCP SYN packets can be dynamically adjusted based on the incoming packet rate. FIG. 5 illustrates a cryptographic strength versus packet rate graph 500 for a cookie verification filtering technique, according to some embodiments. Various curves 502, 504, 506 illustrate different possible relationships between cryptographic strength and the incoming packet rate. New TCP SYN packets will generally not match an existing session in the pseudo-activity table unless they are a retransmitted packet or they collide with another existing session hash value. During an attack, the attacking sender can be probed using a SYN cookie, which comprises a SYN-ACK response that embeds an encrypted signature of the initial packet. A regular sender will send back the signed packet, whereas a spoofing attacker will not get the response packet and will be unable to provide the signature back to validate the session. The regular sender can be differentiated from the attacking sender by verifying the cryptographic signature on the initial packet returned by the sender. However, generating and verifying such signed packets can be cryptographically expensive. As illustrated by FIG. 5, the fourth packet filtering module can reduce the strength and complexity of the cryptographic algorithm used for the packet signatures as the packet rate increases. This adjustment of the strength of the cryptographic algorithm can be made on-the-fly based on the instantaneous packet rate such that the packet shield system is never saturated causing decreased performance. Generally, the cryptographic cookie verification may be performed by a protocol stack, while the regulation of the cryptographic complexity may be specified this fourth packet filtering module/means.

The packet filtering modules and methods described above can be sequenced in various ways depending on the type of incoming packet and the type of attack. Any arrangement of packet filtering modules can be changed to add/remove modules from the packet shield system. Additionally, the amount of the memory or CPU cache used for the TTL lookup table, packet signatures, or pseudo-activity cache can be increased or decreased.

Figure 6:
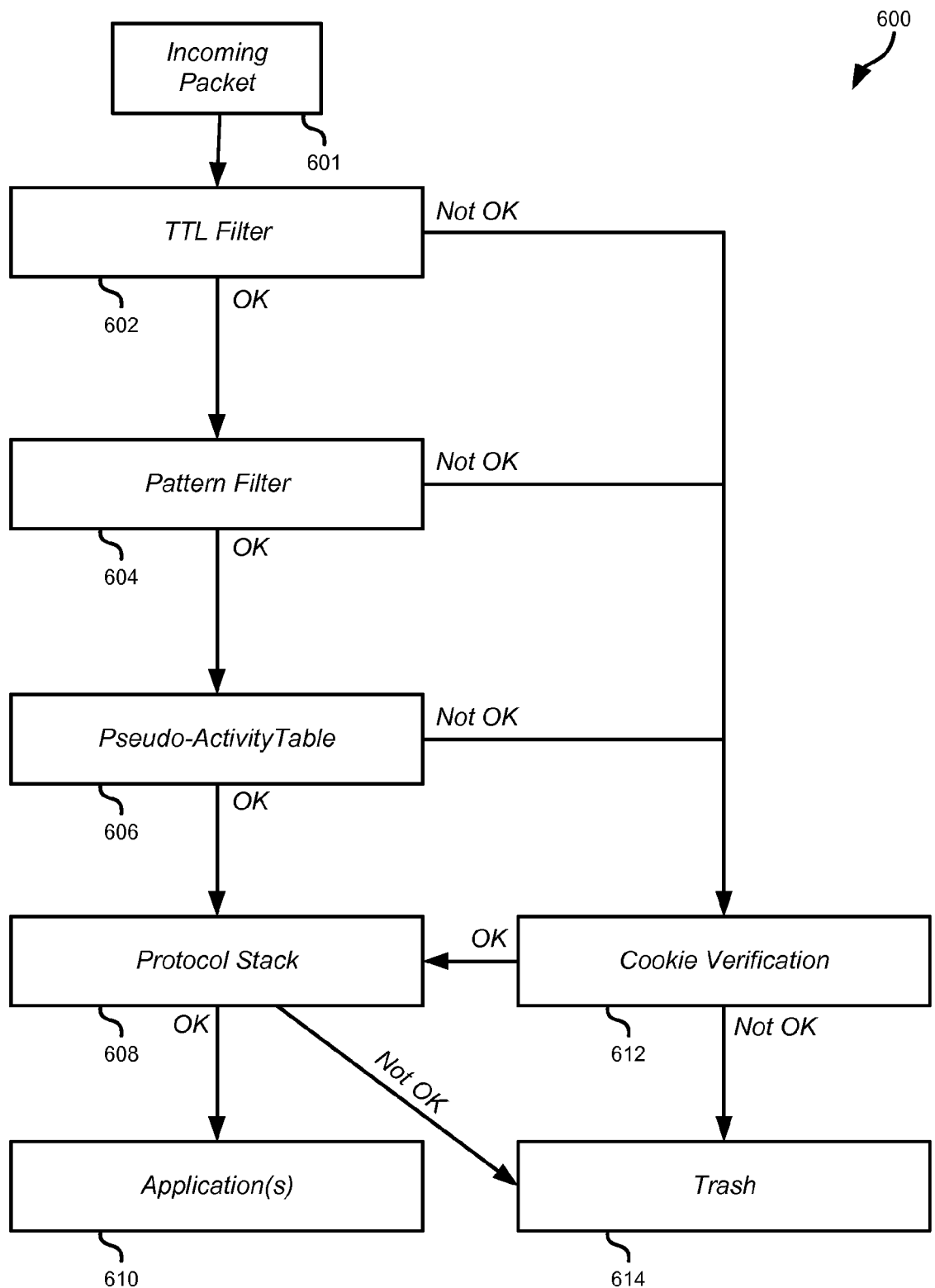
FIG. 6 illustrates a block diagram of an incoming packet working its way through an exemplary arrangement of a packet shield architecture, according to some embodiments.

FIG. 6 illustrates a block diagram 600 of an incoming packet working its way through an exemplary arrangement of a packet shield architecture, according to some embodiments. Incoming packet 601 can first be passed through the TTL filter 602. Next, the incoming packet 601 can pass through the pattern filter 604 that analyzes incoming packets, generates packet signatures of known invalid packets, and evicts invalid packets that match known invalid signatures. Next, incoming packet 601 can pass through the hash function of the pseudo-activity table 606. In this embodiment, all packets belonging to a valid pseudo session, with a valid TTL, and which do not exhibit a repetitive pattern can be delivered through the protocol stack 608. Any remaining packets that do not pass through one or more of these filtering modules may need subjected to further scrutiny. For example, the cryptographically signed cookies of the fourth filtering method described above can be used 612. Note that the cookie verification method may be carried out by one of the layers of the protocol stack 608, and the level of cryptographic complexity may be regulated by a filtering module in the packet shield system. Packets that then fail can be discarded (614), while packets that survive can pass through the upper levels of the protocol stack 608 and be passed to system applications 610.

It will be understood that this particular arrangement of packet filtering techniques and modules is merely exemplary and not meant to be limiting. Packet filtering modules may be freely substituted and/or rearranged depending on the particular embodiment. For example, some embodiments have been found to perform better when the TTL filter 602 and pattern filter 604 are executed prior to the pseudo-activity table 606. However, other embodiments have been found to perform better when the pseudo-activity table 606 is executed prior to the TTL filter 602.

When deploying the shield modules above on a general purpose operating system, it becomes possible to filter traffic using very little in the way of processing resources up to the packet rate supported by the network interfaces. For example, a Xeon™ multi-core processor can run this packet shield system bound to a single core while processing at a 10 Gbit line rate or 14.8 million packets per second. The protocol stack sees all valid packets, and most of the invalid ones (spoofed or forged) are dropped before reaching it, thus representing a tiny fraction of the protocol stack's workload. The ratio of valid packets to all packets in an exemplary configuration is 98% or better, but could be 90%, 95%, 99% or better. In other embodiments, packet shield could run on an off-the-shelf network card by itself.

Figure 7:
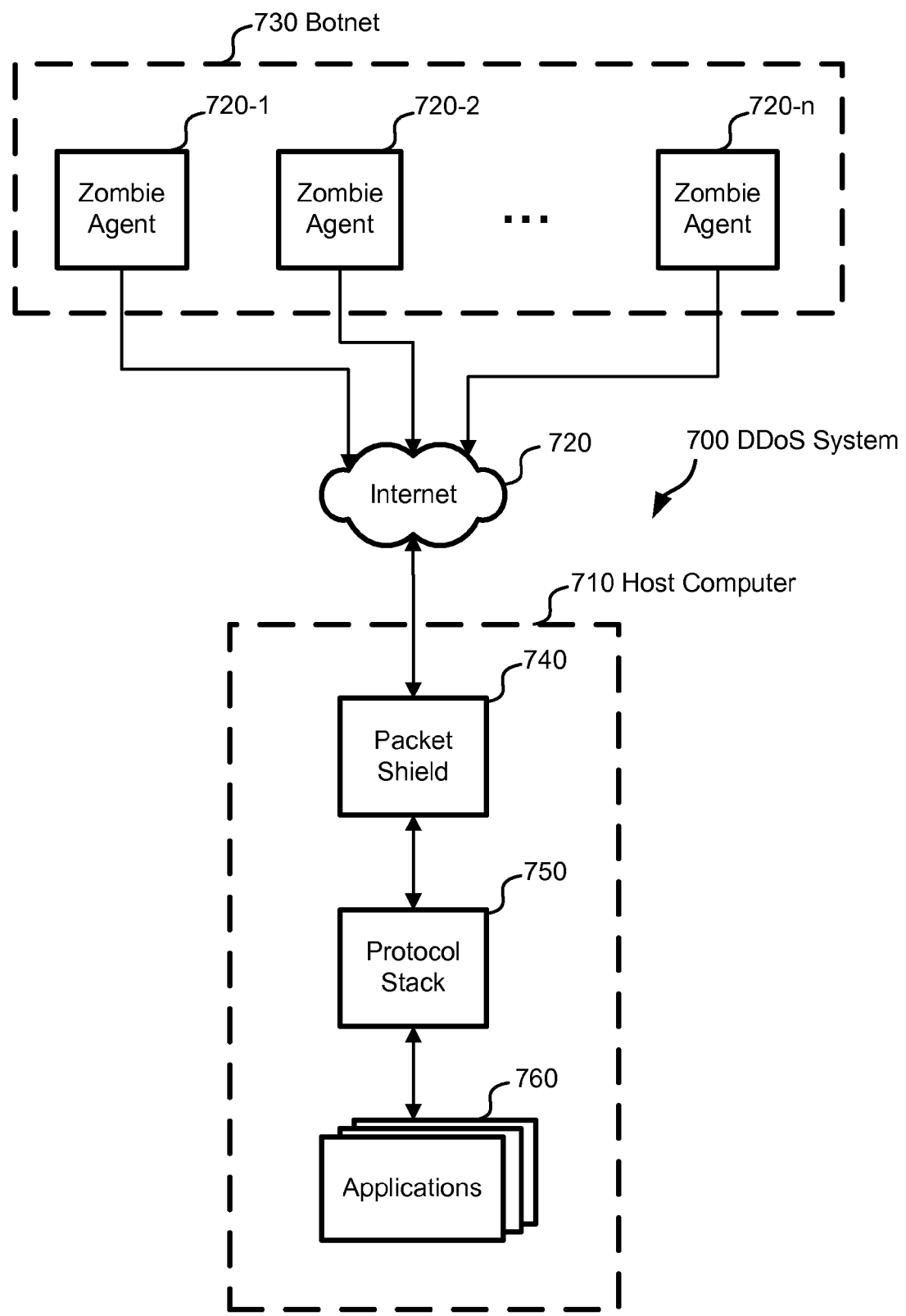
FIG. 7 illustrates a block diagram of a DDoS system using a packet shield, according to some embodiments.

FIG. 7 illustrates a block diagram of a DDoS system 700 using a packet shield system, according to some embodiments. In this embodiment, a botnet 730 of many zombie agents 720 distributed across the Internet 720 are shown. The zombie agents 720 work in concert to collectively perform a DDoS on a host computer 710. The host computer 710 could be a web server, load balancer, edge server, or any other Internet connected computer. In this embodiment, the host computer 710 is a web server running on commodity hardware.

Within the host computer 710 is software that customizes the commodity hardware to perform as a web server, but other embodiments could operate as an edge server, load balancer, transcoder, etc. A packet shield system 740 as described above terminates the protocol connections and filters away many of the DoS packets, but not all of them. The packet shield 740 performs the filtering prior to the protocol stack 750 and could be performed on one or more cores of the host computer 710 or within the network card or circuit. A protocol stack interface may exist between the packet shield system 740 and the protocol stack 750. The protocol stack interface may be configured to pass valid packets and any remaining invalid packets from the packet shield 742 the protocol stack 750. The protocol stack 750 processes the packets passed to it prior to relaying the received information to one or more applications 760 running on the host computer 710. Without the packet shield 740, the protocol stack 750 would be overwhelmed by most DoS attacks.

Figure 8:
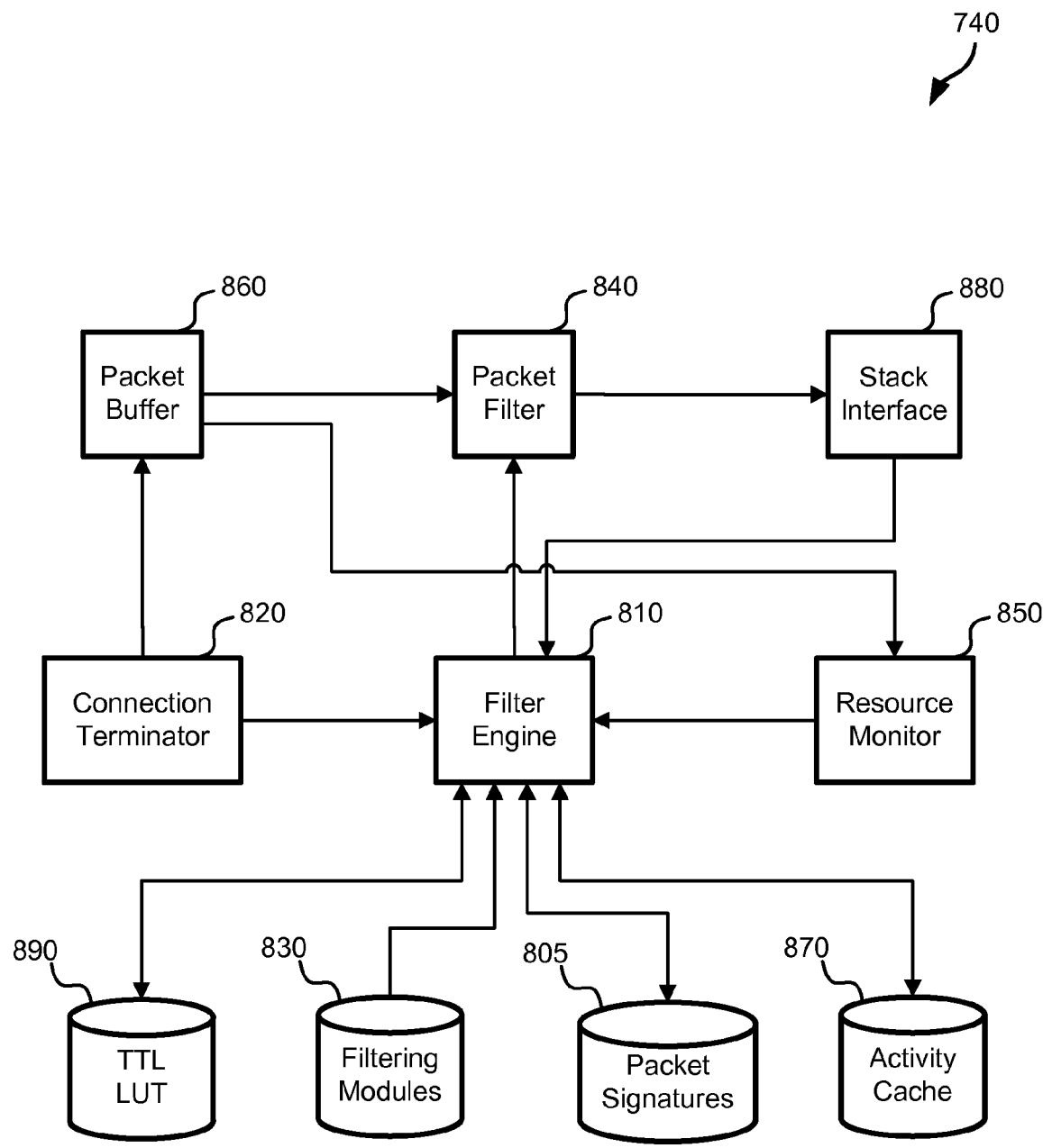
FIG. 8 illustrates a block diagram of an exemplary architecture of a packet shield system, according to some embodiments.

FIG. 8 illustrates a block diagram of an exemplary architecture of a packet shield system 740, according to some embodiments. Packets are received at the connection terminator 820. The packets are stored in a packet buffer 880 while the packet shield 740 performs its analysis. A filter engine 810 loads the various filtering modules 830 that analyze the packets. The filter engine could scale up and down resource usage by the filtering modules 830 according to the current backlog in the packet buffer 860. In this embodiment, there are filtering modules 830 that perform pseudo-session mapping, TTL testing, crypto scaling, and repetitive packet recognition, among other operations. These filtering modules could run on the same or different cores within the host computer 710. More modules could be added to inspect packets in additional ways. As the DoS/DDoS attacks change or become more sophisticated, the filtering modules can be improved or supplemented by new filtering modules.

The various filtering modules consume resources of the host computer 710 to varying degrees. This embodiment consumes computing resources for a TTL lookup table (LUT) 890 for the TTL testing, a pseudo-activity cache 870 for the pseudo-session mapping, and packet signatures 805 for packet pattern recognition module. The resources could be CPU cache, random access memory (RAM), CPU cycles, and/or CPU cores. To run at fast line rates, the resources may typically include a CPU cache to store the TTL LUT 890, activity cache 870, and packet signatures 805. A resource monitor function 850 monitors consumption of the resources so that the filter engine 810 can scale the size of and storage media used for the TTL LUT 890, activity cache 870, and packet signatures 805 accordingly. Additionally, the resource monitor function 850 measures the packet backlog in the packet buffer 860.

For the packets that are excluded using the filtering modules 830, the packet filter 840 prevents them from passing to the protocol stack. The filtering modules 830 are designed to remove most, but not all invalid packets. At the line rates that packets are received, commodity hardware cannot fully filter away all invalid packets. Most are removed and the remainder can be filtered away by the protocol stack. A stack interface 880 passes those packets to the protocol stack. Additionally, information on certain functions of the protocol stack, such as a SYN cookie algorithm, a cryptographic key, a confirmation from the local stack that the packet belongs to an existing session that is used to maintain the session cache, and/or the like, can be passed back to the filter engine 810. Some or all of the shield modules can be scaled based upon this feedback. For example, the activity cache 870 could be scaled in size or have the pseudo-activity mapping filtering module processing resources scaled if the DoS attack was passing too many invalid packets to the protocol stack.

Figure 9:
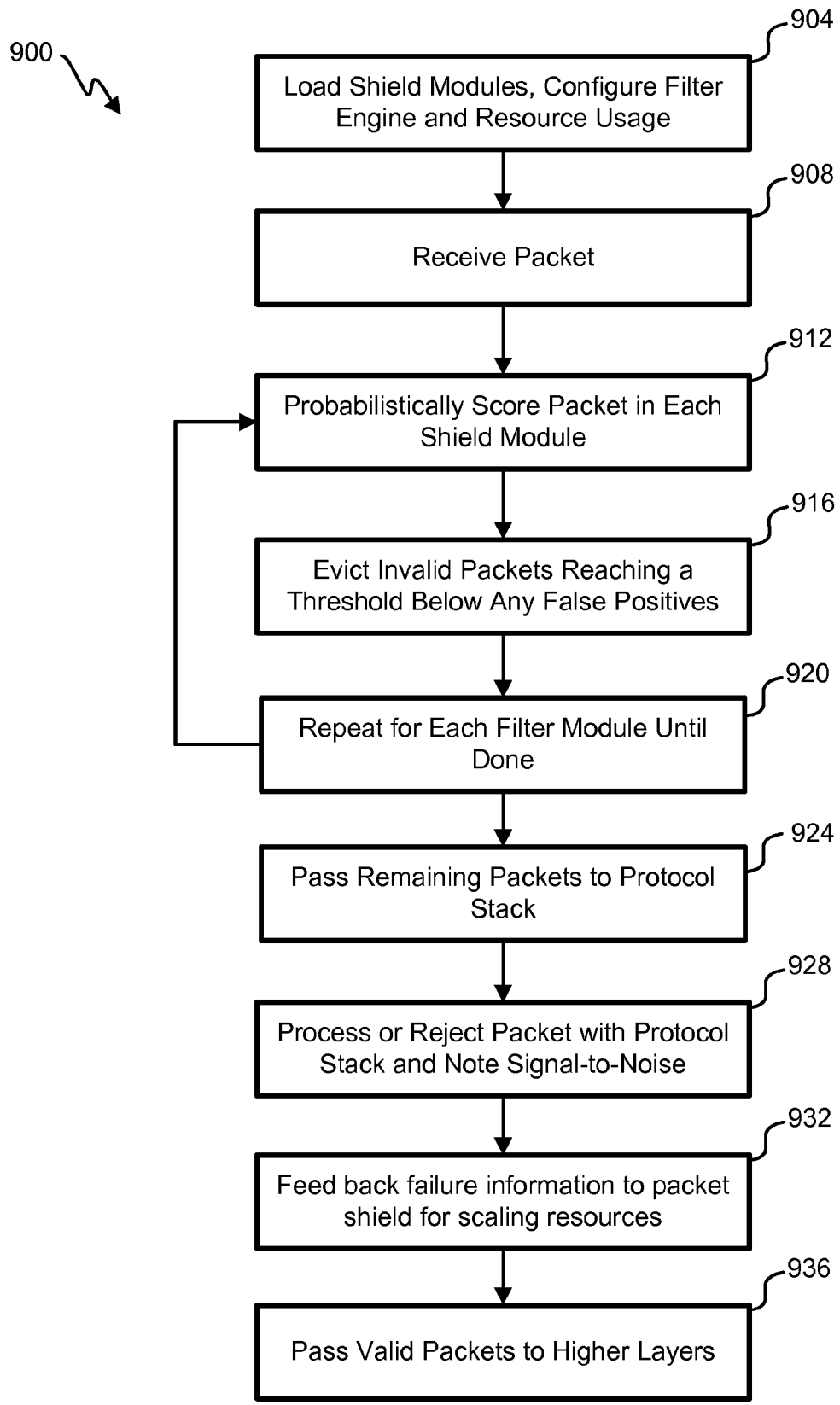
FIG. 9 illustrates a flowchart of a packet screening process, according to some embodiments.

FIG. 9 illustrates a flowchart 900 of a packet screening process, according to some embodiments. The depicted portion of the process begins in block 904 where the filtering modules are loaded and the size and location of the TTL LUT 890, activity cache 870, and packet signatures 805 are configured. The sequence and priority of the filtering modules are configured for the filter engine 810. Packets are received from the Internet 720 in block 908. In this embodiment, there could be one, two or more network cards that simultaneously receive packets that are processed by the packet shield system 740.

For each packet, two or more shield modules 830 may individually produce a score. A threshold score for each shield module 830 is used to denote a packet that is invalid without worry of a false-positive designation. In this embodiment, any shield module 830 can exclude any packet autonomously in block 916. In other embodiments, scores from the various shield modules 830 could be combined into a composite score that is judged to determine if a particular packet should be excluded. Blocks 912 and 916 are repeated for each shield module 830. The packets that avoid eviction by the shield modules 830 are passed to the protocol stack 750 in block 924.

The protocol stack processes valid packets and rejects invalid ones in block 928 passing information about session ownership for outgoing packets so that the activity table can be updated. The failure information is passed back to the packet shield 740 in block 932. The packet shield 740 can scale resources according to what the protocol stack is seeing. For example, the protocol stack could report information denoting a SYN flood attack having a particular success rate and the packet shield system could load the most effective filtering modules 830 and prioritize their resources over the filtering modules 830 less effective for a SYN flood attack. The protocol stack 750 passes the information in the valid packets to the higher layers in the OSI model in block 936.

Figure 10:
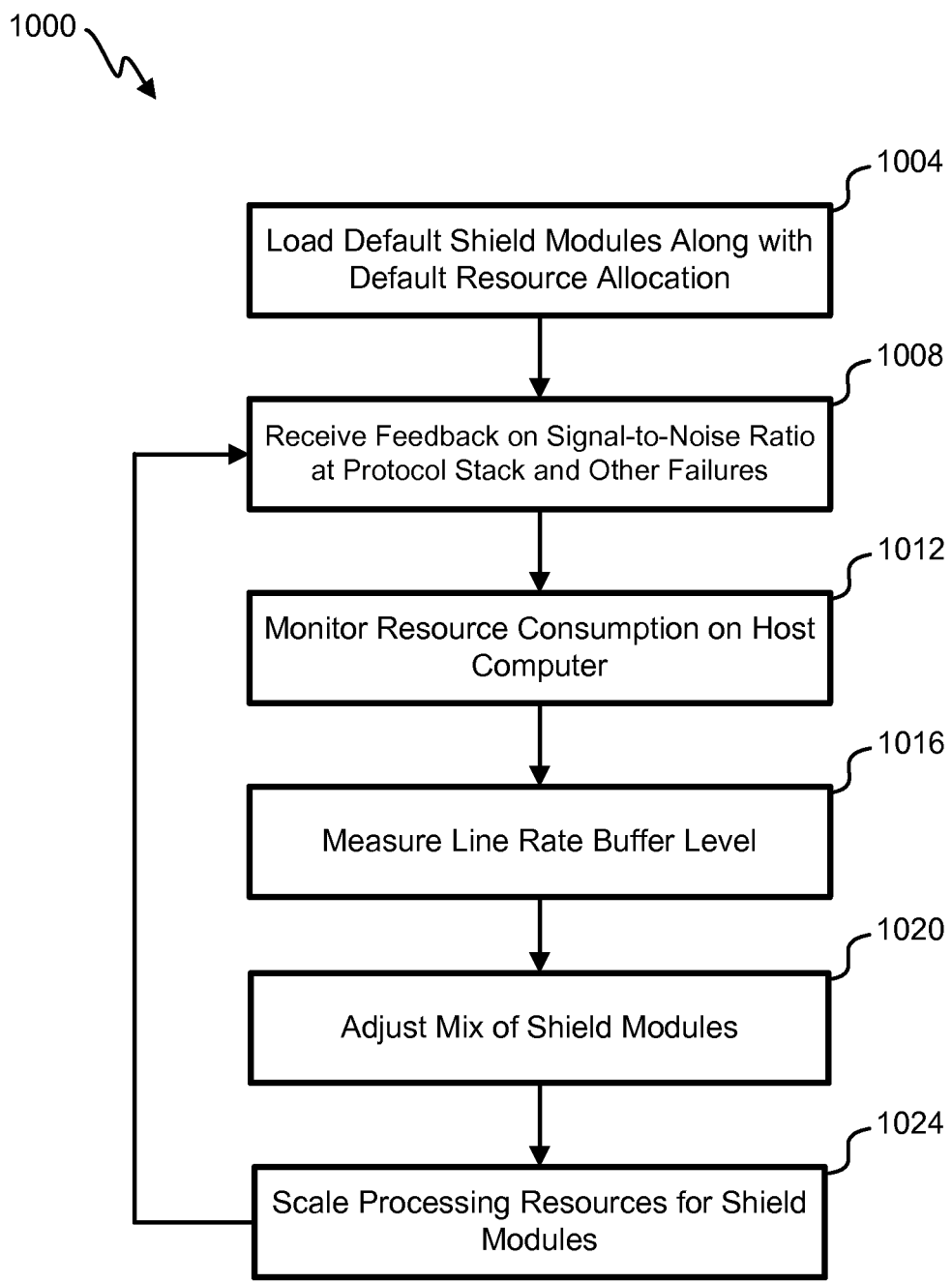
FIG. 10 illustrates a flowchart of an adjustment process for the packet shield modules, according to some embodiments.

FIG. 10 illustrates a flowchart 1000 of an adjustment process for the packet shield modules, according to some embodiments. This embodiment automatically scales the effectiveness of the shield modules by modifying the resource allocation for them. The depicted portion of the process begins in block 1004, where default filtering modules 830 are loaded along with a default resource allocation configured for each. At block 1008, the performance of the packet shield system 740 is judged at the protocol stack 750 and reported to the packet shield system 740. The resource monitor 850 measures consumption of the resources by the packet shield system 740 on the host computer 710 in block 1012. The size of the packet buffer 860 is noted in block 1016.

After gathering the relevant resource and performance information, the filter engine 810 adjusts the mix of shield modules 830 by adding or removing those that are not needed in block 820. Processing resources are also adjusted by the filter engine 810 in block 1024. Processing loops back from block 1024 to block 1008 to repeat the discovery and adjustment blocks. Repeating blocks 1008 through 1024 could be done periodically or continually in different embodiments. The frequency of the reevaluation could depend on current resource consumption to speed when resources were readily available and slow when they were not. Table 1 below lists resources that may be an initial configuration that could change as the DoS/DDoS attack is scaled up or down.

TABLE 1

Initial resource allocation.
Table. Shield Modules

| Module | Size |
| --- | --- |
| Pseudo-Activity Table | 3 million entries |
| TTL LUT | 5 million entries |
| Pattern Analysis | 100,000 entries |

Figure 11:
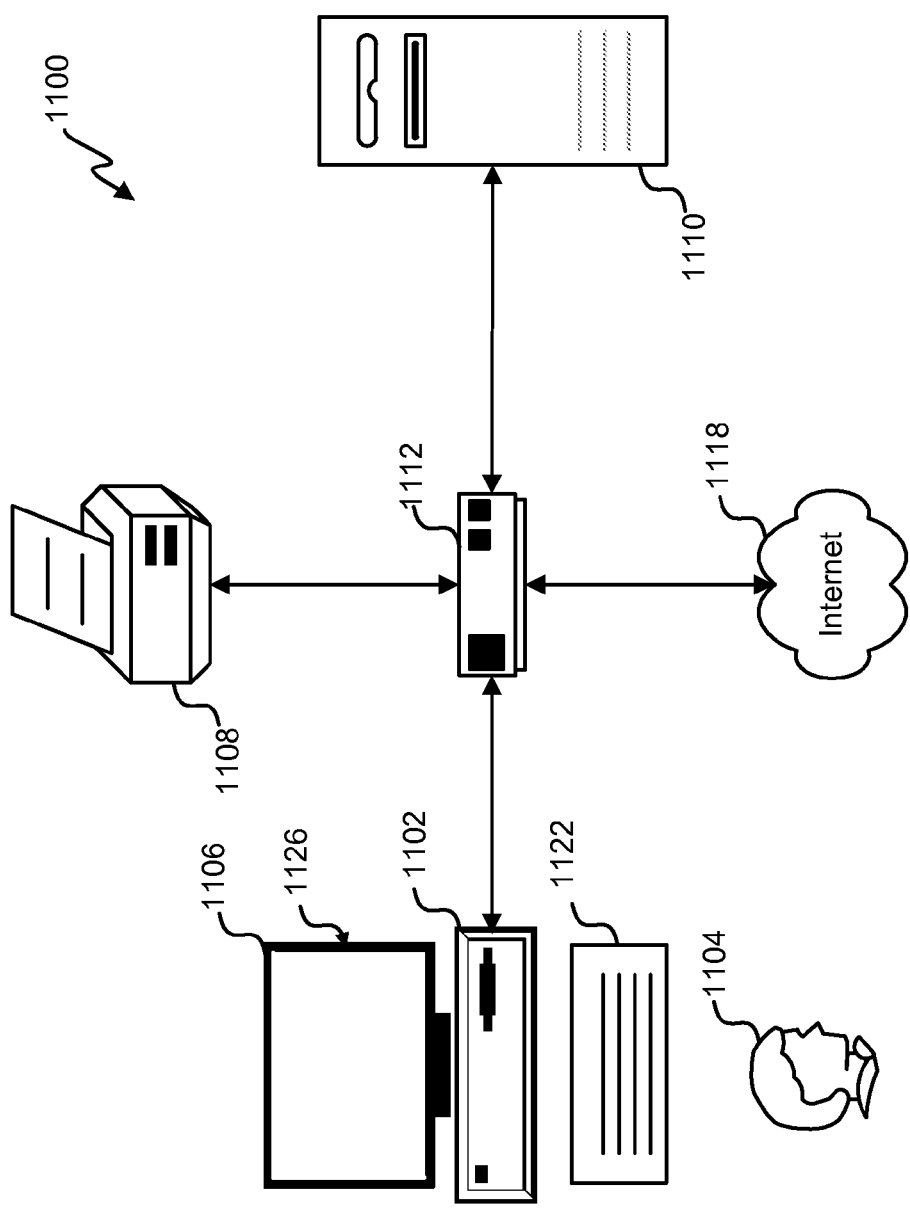
FIG. 11 illustrates an exemplary environment in which embodiments may be implemented, according to some embodiments.

FIG. 11 illustrates an exemplary environment in which embodiments may be implemented, according to some embodiments. Embodiments may be implemented in a computer system 1100 that can be used by a designer 1104 to design, for example, electronic designs. The computer system 1110 can include a computer 1102, an optional keyboard 1122, a network router 1112 or other routing fabric, an optional printer 1108, and an optional monitor 1106. The monitor 1106, processor 1102 and keyboard 1122 are part of a computer system 1126, which can be a laptop computer, desktop computer, handheld computer, rack-mounted computer, mainframe computer, etc. The monitor 1106 can be a CRT, flat screen, remote terminal, etc.

A designer 1104 can input commands into the computer 1102 using various input devices, such as a mouse, keyboard 1122, track ball, touch screen, etc. If the computer system 1100 comprises a mainframe, a designer 1104 can access the computer 1102 using, for example, a terminal or terminal interface. Additionally, the computer system 1126 may be connected to a printer 1108 and a server 1110 using a network router 1112, which may connect to the Internet 1118 or a WAN.

The server 1110 may, for example, be used to store additional software programs and data. In one embodiment, software implementing the systems and methods described herein can be stored on a storage medium in the server 1110. Thus, the software can be run from the storage medium in the server 1110. In another embodiment, software implementing the systems and methods described herein can be stored on a storage medium in the computer 1102. Thus, the software can be run from the storage medium in the computer system 1126. Therefore, in this embodiment, the software can be used whether or not computer 1102 is connected to network router 1112. Printer 1108 may be connected directly to computer 1102, in which case, the computer system 1126 can print whether or not it is connected to network router 1112.

Figure 12:
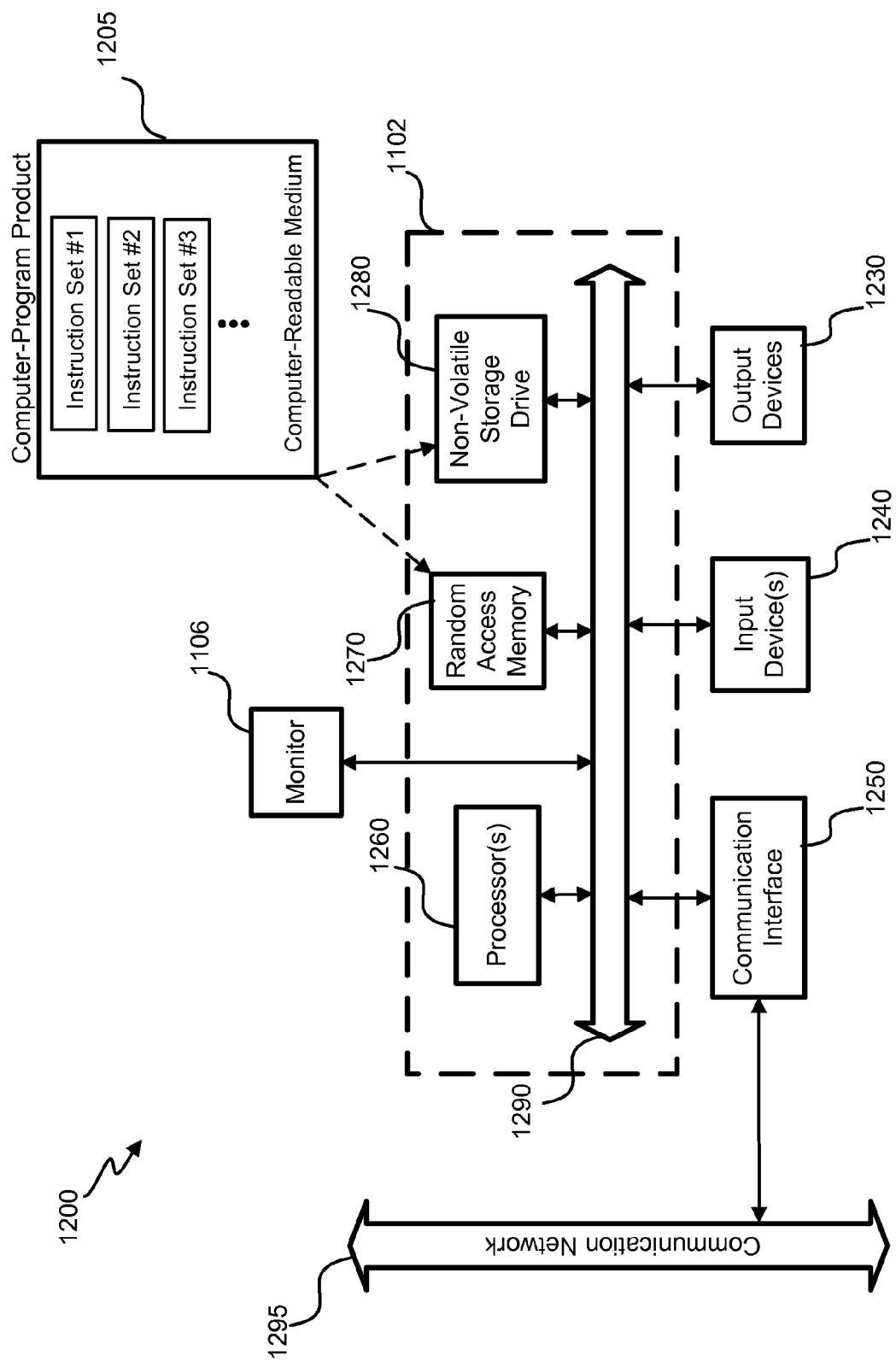
FIG. 12 illustrates an embodiment of a special-purpose host computer system, according to some embodiments.

FIG. 12 illustrates an embodiment of a special-purpose host computer system 1200, according to some embodiments. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1126, it is transformed into the special-purpose host computer system 1200.

Special-purpose host computer system 1200 comprises a computer 1102, a monitor 1106 coupled to computer 1102, one or more additional user output devices 1230 (optional) coupled to computer 1102, one or more user input devices 1240 (e.g., keyboard, mouse, track ball, touch screen) coupled to computer 1102, an optional communications interface 1250 coupled to computer 1102, a computer-program product 1205 stored in a tangible computer-readable memory in computer 1102. Computer-program product 1205 directs host computer system 1100 to perform the above-described methods. Computer 1102 may include one or more processors 1260 that communicate with a number of peripheral devices via a bus subsystem 1290. These peripheral devices may include user output device(s) 1230, user input device(s) 1240, communications interface 1250, and a storage subsystem, such as random access memory (RAM) 1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1102 and loaded into memory 1270. Each processor 1260 may comprise a microprocessor, such as a microprocessor from Intel® or Advanced Micro Devices, Inc.®, or the like. To support computer-program product 1205, the computer 1102 runs an operating system that handles the communications of product 1205 with the above-noted components, as well as the communications between the above-noted components in support of the computer-program product 1205. Exemplary operating systems include Windows® or the like from Microsoft® Corporation, Solaris® from Oracle®, LINUX, UNIX, and the like.

User input devices 1240 include all possible types of devices and mechanisms to input information to computer system 1102. These may include a keyboard, a keypad, a mouse, a scanner, a digital drawing pad, a touch screen incorporated into the display, audio input devices such as voice recognition systems, microphones, and other types of input devices. In various embodiments, user input devices 1240 are typically embodied as a computer mouse, a trackball, a track pad, a joystick, wireless remote, a drawing tablet, a voice command system. User input devices 1240 typically allow a user to select objects, icons, text and the like that appear on the monitor 1106 via a command such as a click of a button or the like. User output devices 1230 include all possible types of devices and mechanisms to output information from computer 1102. These may include a display (e.g., monitor 1106), printers, non-visual displays such as audio output devices, etc.

Communications interface 1250 provides an interface to other communication networks and devices and may serve as an interface to receive data from and transmit data to other systems, WANs and/or the Internet 1118. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1102, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store of instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1102 communicate with each other as intended. Although bus subsystem 1290 is shown schematically as a single bus, alternative embodiments of the bus subsystem may utilize multiple busses or communication paths within the computer 1102.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A packet filtering system for mitigating denial of service (DoS) and/or distributed denial of service (DDoS) attacks against one or more applications associated with a server, the packet filtering system comprising:
a first filter stored in a memory that processes received packets, the received packets having been transmitted to the packet filtering system through a network, the first filter being configured to:
filter out a first plurality of invalid packets from the received packets;
allow a plurality of valid packets from the received packets to pass through the first filter; and
allow a second plurality of invalid packets from the received packets to pass through the first filter, wherein:
at least some of the first plurality of invalid packets and at least some of the second plurality of invalid packets are sent to the packet filtering system as part of the DoS and/or DDoS attack; and
the second plurality of invalid packets comprises a third plurality of invalid packets and a fourth plurality of invalid packets;
a second filter stored in the memory and communicatively coupled in series with the first filter, the second filter comprising: (i) a hash function that assigns hash values to packets received by the second filter; and (i) an activity table having a fixed size that is stored on a single CPU core, wherein the activity table comprises entries for the hash values indicating whether a received packet belongs to a valid session, wherein the second packet filter is configured to:
receive the plurality of valid packets and the second plurality of invalid packets from the first filter;
filter out the third plurality of invalid packets;
allow the plurality of valid packets to pass through the second filter; and
allow the fourth plurality of invalid packets to pass through the second filter; and
a protocol stack interface configured to:
pass the plurality of valid packets and the fourth plurality of invalid packets from the second filter to a protocol stack, wherein the protocol stack filters out the fourth plurality of invalid packets and allows the plurality of valid packets to pass through to the one or more applications.

2. The packet filtering system of claim 1, wherein:
the second filter is configured to respond to sources of each of the plurality of valid packets and sources of the second plurality of invalid packets; and
the first filter is configured to filter out the first plurality of invalid packets without responding to sources of the first plurality of invalid packets.

3. The packet filtering system of claim 1, wherein:
the first filter is effective at filtering a first type of invalid packet, but ineffective at filtering a second type of invalid packet; and
the second filter is effective at filtering the second type of invalid packet.

4. The packet filtering system of claim 1, wherein the first filter is configured to identify spoofed packets by:
storing a collection of valid time-to-live (TTL) indicators associated with a source address;
receiving incoming packets associated with the source address;
extracting a TTL indicator for each incoming packet;
comparing the extracted TTL indicator to the collection of valid TTL indicators; and
determining whether the incoming packets are valid based on whether the extracted TTL indicators fall within a range of the valid TTL indicators.

5. The packet filtering system of claim 1, further comprising a third filter stored in the memory, the third filter being configured to:
receive packets identified as invalid by the first filter or the second filter;
group the packets identified as invalid into packet groups based on characteristics of the packets identified as invalid;
generate signatures for each packet group;
compare each packet that is passed through the first filter and the second filter to the signatures; and
filter out packets that are passed through the first filter and the second filter and that match at least one of the signatures.

6. The packet filtering system of claim 1, wherein the packet filtering system runs on a single core processor at a 10 Gbit/sec line rate.

7. The packet filtering system of claim 6, wherein the first packet filter and the second packet filter filter invalid packets such that less than 200,000 packets per second are delivered to the protocol stack for filtering.

8. A method for mitigating denial of service (DoS) and/or distributed denial of service (DDoS) attacks against one or more applications associated with a server, the method comprising:
- receiving packets transmitted to the packet filtering system through a network;
- filtering out a first plurality of invalid packets from the received packets using a first filter;
- allowing a plurality of valid packets from the received packets to pass through the first filter;
- allowing a second plurality of invalid packets from the received packets to pass through the first filter, wherein:
  - at least some of the first plurality of invalid packets and at least some of the second plurality of invalid packets are sent to the packet filtering system as part of the DoS and/or DDoS attack; and
  - the second plurality of invalid packets comprises a third plurality of invalid packets and a fourth plurality of invalid packets;
- passing the plurality of valid packets and the second plurality of invalid packets from the first filter to a second filter that is communicatively coupled in series with the first filter, the second filter comprising: (i) a hash function that assigns hash values to packets received by the second filter; and (i) an activity table having a fixed size that is stored on a single CPU core, wherein the activity table comprises entries for the hash values indicating whether a received packet belongs to a valid session;
- filtering out the third plurality of invalid packets using the second packet filter;
- allowing the plurality of valid packets to pass through the second filter;
- allowing the fourth plurality of invalid packets to pass through the second filter;
- passing the plurality of valid packets and the fourth plurality of invalid packets from the second filter to a protocol stack, wherein the protocol stack filters out the fourth plurality of invalid packets and allows the plurality of valid packets to pass through to the one or more applications.

9. The method of claim 8, wherein:
the second filter is configured to respond to sources of each of the plurality of valid packets and sources of the second plurality of invalid packets; and
the first filter is configured to filter out the first plurality of invalid packets without responding to sources of the first plurality of invalid packets.

10. The method of claim 8, wherein:
the first filter is effective at filtering a first type of invalid packet, but ineffective at filtering a second type of invalid packet; and
the second filter is effective at filtering the second type of invalid packet.

11. The method of claim 8, wherein the first filter is configured to identify spoofed packets by:
- storing a collection of valid time-to-live (TTL) indicators associated with a source address;
- receiving incoming packets associated with the source address;
- extracting a TTL indicator for each incoming packet;
- comparing the extracted TTL indicator to the collection of valid TTL indicators; and
- determining whether the incoming packets are valid based on whether the extracted TTL indicators fall within a range of the valid TTL indicators.

12. The method of claim 8, further comprising:
- receiving, by a third filter, packets identified as invalid by the first filter or the second filter;
- grouping, by the third filter, the packets identified as invalid into packet groups based on characteristics of the packets identified as invalid;
- generating, by the third filter, signatures for each packet group;
- comparing, by the third filter, each packet that is passed through the first filter and the second filter to the signatures; and
- filtering out, by the third filter, packets that are passed through the first filter and the second filter and that match at least one of the signatures.

13. The method of claim 8, wherein the packet filtering system runs on a single core processor at a 10 Gbit/sec line rate.

14. The method of claim 13, wherein the first filter and the second filter invalid packets such that less than 200,000 packets per second are delivered to the protocol stack for filtering.

15. A method for filtering packets originating from the Internet, the method comprising:
- loading a plurality of filters in a memory including a first filter and a second filter;
- receiving a plurality of packets from various sources from the Internet;
- applying the first filter to the plurality of packets to identify a first packet that is invalid;
- filtering the first packet prior to a protocol stack;
- applying the second filter to the plurality of packets to identify a second packet that is invalid, the second filter comprising: (i) a hash function that assigns hash values to packets received by the second filter; and (i) an activity table having a fixed size that is stored on a single CPU core, wherein the activity table comprises entries for the hash values indicating whether a received packet belongs to a valid session;
- filtering the second packet prior to the protocol stack; and
- passing a third packet from the plurality of packets to the protocol stack that determines the third packet is invalid.

16. The method of claim 15, wherein the protocol stack passes information to at least one of the plurality of filters.

* * * * *